May 19, 1970  A. A. HIRSCH  3,512,650

METHOD FOR INSTALLATION OF BLENDED GRANULAR FILTER BED LAYERS

Original Filed Dec. 21, 1967

A. Adler Hirsch
INVENTOR.

3,512,650
METHOD FOR INSTALLATION OF BLENDED
GRANULAR FILTER BED LAYERS
Abraham Adler Hirsch, 141 Norwood St.,
Shreveport, La. 71105
Original application Dec. 21, 1967, Ser. No. 692,431.
Divided and this application July 15, 1969, Ser.
No. 841,892
Int. Cl. B01d 23/16
U.S. Cl. 210—290    3 Claims

ABSTRACT OF THE DISCLOSURE

Blends of varying proportions of fine and coarse grained components having different specific gravities are mixed mechanically preparatory to placement in a filter box, then chuted into position. Each lamina of specific composition is spread to fill a shallow frame which is then screened flat. In large filters the frame is next moved laterally until the whole filter is so covered. This operation is repeated at the next higher level, increasing the proportion of the larger grains in downflow filters, until the whole depth of composite bed is built.

---

This is a division of my co-pending application Ser. No. 692,431, filed Dec. 21, 1967, entitled "Blended Granular Beds for Water and Wastewater Treatment Filters."

My invention relates to the mechanical details for constructing a composite filter bed placed in discrete layers, as described in the parent disclosure.

DESIRABILITY OF BLENDED BED STRUCTURE

Advantages of the continuously, reversedly graded pore size filter bed, based on grain size alone, without dependency on differences in hydraulic uplift properties during the act of backwashing to effect mixture of the components has been carefully covered in the co-pending application.

Effective size of grains should decrease continuously in the direction of filtration, thereby entrapping larger floc in the upper zones, intermediate size floc next, and finest floc in the bottom portion of the bed. In this way the whole depth of bed is operative for floc removal and storage until the next backwash. Length of runs will then be a maximum, and wash water requirements a minimum. Wide disparity in grain size at any one altitude in a filter is undesirable since small grains near the top accelerate blocking by suspended matter, and large grains carried to the bottom take up space without functional value.

In order to secure geometric size gradation, hydrodynamic classification by backwashing must be avoided, since this involves other relevant factors, namely, shape of grain, porosity and specific gravity which have nothing whatever to do with grain size or dimensions of contiguous pores. A purely size-based profile through the bed can be obtained only by direct placement during construction of the bed.

It is the object of this application to describe a deliberate placement method for building, layer by layer, a reversedly graded granular filter bed.

SUMMARY OF THE METHOD

Mixtures of the desired proportions of components are prepared in a mixing device mounted on a platform on top the filter box walls, then delivered to shallow forms laid over previously placed material. As each layer having a given composition is completed, the forms are reset above it and the next higher incremental layer added in the same manner. This cycle is repeated until the whole depth of bed is completed, working from the bottom up.

REFERENCE OF DRAWING

Figure 1:
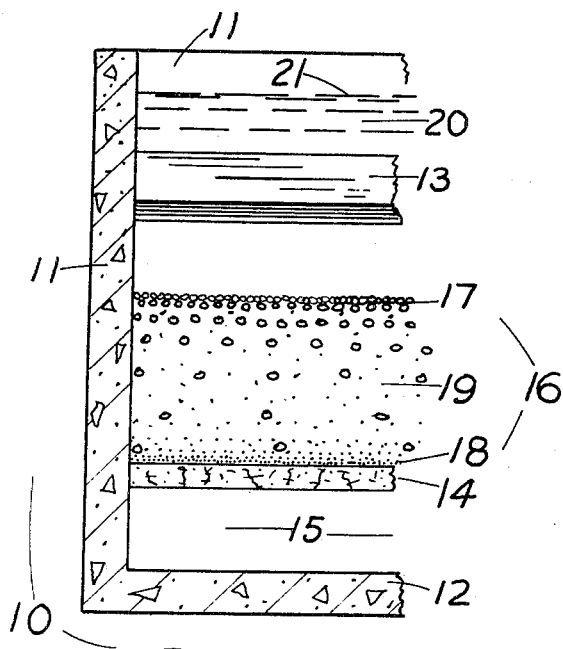
Figure 2:
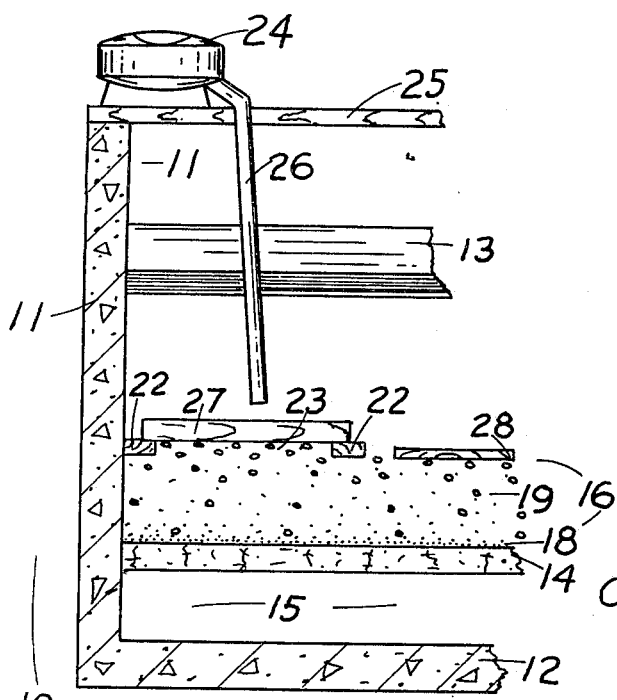

My invention is described with the aid of the accompanying drawing in which:

FIG. 1 is a partial cross section of a filter box containing a blended bed composed of varying proportions of two different sized materials laid in separate layers, and FIG. 2 is a partial cross section of a filter box and bed as in FIG. 1 during the course of construction to explain the manipulations during placement of media.

Reference to the separate figures now follows.

DESCRIPTION OF THE BED

In FIG. 1 filter box 10, consisting of containing walls 11 and floor 12 has wash water troughs 13 and porous plate bottoms 14 installed therein. It is fitted with suitable connections and valving, not shown. Underneath the porous plates is a plenum 15 into which filtrate collects and from which wash water is distributed. This particular type of underdrain has been chosen for illustration merely as a matter of simplicity. Resting immediately on the porous plates is a blended dual media bed 16, as described more particularly in the parent application, consisting of a series of anthracite-sand layers in which the top layer 17 is the larger grained anthracite, the bottom layer is the smaller grained sand 18, and the intermediate septum zone 19 contains variably proportioned blends of anthracites and said so that the effective size of the blend decreases with its depth in the bed.

Anthracite and sand sizes are selected so that these separate materials are hydrodynamically identical in backwash response. Hence any combination of the pair will shift without differential separation when washing the bed. Actually, the bed is built stepwise in shallow increments; so that it functions practically as having a continuously variable composition.

The example shows a downflow filter. Applied water 20 covers the top of the bed to influence level 21. An analogous arrangement applies to upflow filters.

METHOD OF CONSTRUCTION

FIG. 2 shows a method for placement of a blended bed 16, such as in FIG. 1, into filter box 10. Anthracite and filter sand are the coarse and fine materials, respectively, used in the illustratiton. A bottom starter layer 18 of finer material is first spread to the desired level over porous plate bottom 14 before starting to stack the blended intermediate zone 19.

A preliminary test wash should be admitted at this stage to assure freedom from boils or other irregular spots before proceeding further.

In order to place the transition blended section 19, spacers or gage boards 22, such as 2" x 4" strips of lumber, are laid over the previously leveled bed and the space 23 in-between them filled with an appropriately proportioned blended of media. This mixture is prepared in a mechanical mixer or blender 24 resting on platform 25 atop the filter wall. After sufficient material has been dropped onto the bed through chute 26 the incremental layer 23 is leveled by drawing screed 27 across guide board spacing 23.

After this space is filled across the filter, the guide boards 22 are moved to the next location to be filled. The space left where a guide is lifted is fitted with the same batch from the blendor and levelled across the previously installed areas. Disturbance of the bed structure is prevented by having workmen use walkway board 28. After an incremental layer has been applied over the whole filter the guide boards 22 are reset for the next such layer above it. At the same time the proportions of the separate components discharged by the blendor is changed to conform to the next higher level in the bed.

For accuracy in controlling the thickness of the incremental layer, the materials should either be bone dry, or if moist, the bed should be slightly submerged to obtain free motion of the grains on screeding in order to prevent voids and to level properly.

In applying the principles of this invention the previous directions have mentioned the most preferred technique, however, other methods for blending and placement of the bi-media layer zone may be employed within the scope of this disclosure. Other methods of mixing include manual shoveling, use of a concrete mixer and the like; placement may be by other obvious means for handling materials. The manipulation details are similar, except for order of coarse and fine media, in upflow filters as in downflow beds.

I claim:

1. A method for installing within a filter box a granular filter bed comprising blended layers containing different media of different grain size entailing the steps of placing gage boards above previously laid granular material so as to enclose an area to be filled with an appropriately proportioned blend of the different media, mixing the components of said blend in the proportions corresponding to the depth within said bed currently being installed, delivering the blend of said components so mixed into place between said gage boards, screeding the blended material along the top of said gage boards until an increment in depth is laid level therewith, shifting said gage boards to an adjacent location filling the cavity left by removal of said gage boards with the appropriate blend of media and leveling same with the adjacent surface, and filling and leveling in like manner until the whole area of said bed is traversed, then altering the proportions of the component materials to correspond to the next higher incremental altitude in said bed, mixing and delivering said components as before, and repeating the same process of filling with said blend between said gauge boards at said higher incremental altitude until the whole depth of said filter bed comprising blended layers is built.

2. The method of claim 1 in which mixing of the components of said blend is performed mechanically in a blendor.

3. The method of claim 2 in which delivering the blended materials discharged from said blendor to the filter bed is by means of a chute.

References Cited

UNITED STATES PATENTS

| | | | |
|---|---|---|---|
| 2,021,919 | 11/1935 | Montgomery et al. | 210—290 X |
| 2,302,450 | 11/1942 | Laughlin | 210—275 X |
| 3,080,062 | 3/1963 | Herbert | 210—290 X |
| 3,382,983 | 5/1968 | Stewart | 210—290 X |

SAMIH N. ZAHARNA, Primary Examiner